July 19, 1955
C. G. EWERTZ
2,713,679
SONIC SPEED RECORDER
Filed April 15, 1954
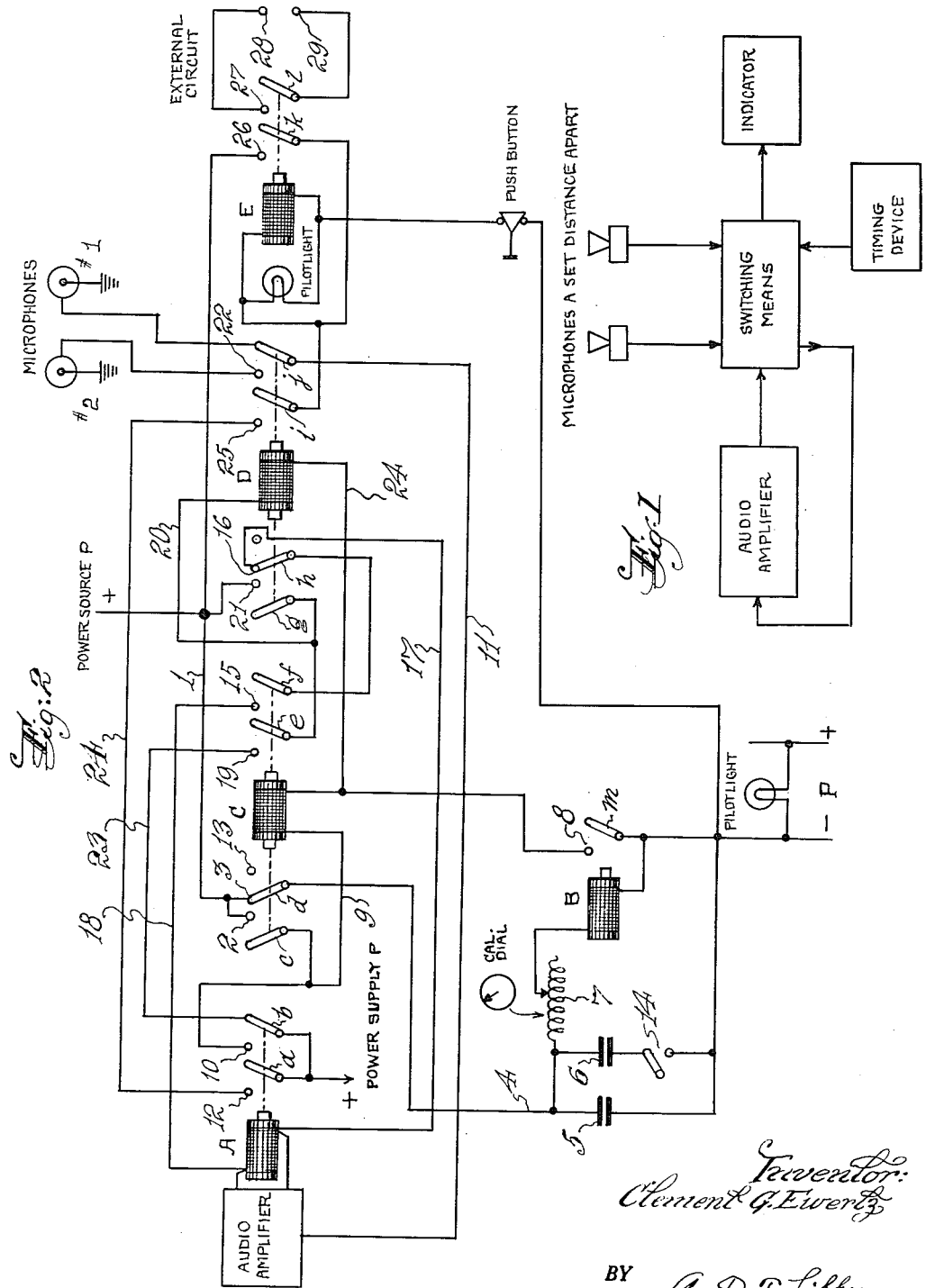

United States Patent Office 2,713,679
Patented July 19, 1955

2,713,679
SONIC SPEED RECORDER
Clement George Ewertz, Paramus, N. J.

Application April 15, 1954, Serial No. 423,398

13 Claims. (Cl. 340—263)

This invention relates to a method of determining the speed of moving objects by picking up the audible noise of the moving objects as they pass two microphones any set distance apart.

Heretofore different means have been used such as having two flexible tubes stretched across a road a set distance apart, the time required for a vehicle to pass over the tubes determining the speed. These have proved impractical during winter months, they are readily visible to a motorist who upon seeing them can slow down, and they are of necessity more or less a permanent installation.

Lights shining across a road into photo-electric cells have also been used. Cars going in both directions interrupt the lights and give false indications. They also are of necessity permanent installations.

Radar devices are being used to determine the speed of cars but their use requires two policemen, one operating the radar device who has to radio to another officer some distance ahead to apprehend a certain car. The fact that they are expensive and complex also limits their use.

It is thus the object of this invention to provide a method of determining the speed of moving objects by picking up the audible noise of the moving object as it passes two microphones a set distance apart. By placing the microphones quite close together, of say ten feet apart, the motorist has no opportunity of slowing down.

It is also an object of this invention to indicate whether moving objects, such as motor vehicles, are travelling either slower or faster than any pre-set speed, or to record on a dial, or any other type of recording device, the speed in miles per hour.

As the equipment required by this method of speed determination is readily portable and can be installed on a police car, the officer can immediately start after and apprehend any speed violator. Being as portable as the car, it can be used anywhere.

It is also an object of this invention to permit counting of the passing vehicles and also counting the number of vehicles exceeding any desired set speed. Thus it can be used to make traffic surveys, the need for traffic lights, the patrolling of any section of a road or highway.

It is a further object of this invention to provide means of controlling traffic lights. As long as cars travel at speeds below any desired set speed, the traffic light— which need not be at an intersection—would remain green. Any car exceeding the set speed would trip the lights from green to amber to red. After a set interval of time the lights would turn green again allowing traffic to proceed. The traffic lights would have to be sufficiently distanced ahead to permit the cars time to stop.

This invention, as illustrated in Figure 1 broadly consists of two microphones of any type capable of responding to the audible noise of the moving objects, at any set distance apart, means of switching first one and then the other microphone to the input of an audio amplifier, switching means operated by the output of the audio amplifier, a timing device such as a resistor-capacitor network or clock, an indicating device such as lights or bells, or a pointer and calibrated dial.

Figure 2 gives a detailed description to give but one example of how this method of determining the speeds of moving objects can be accomplished.

When the relays and associated parts are connected to a source power, herein shown as direct current for convenience, positive and negative potentials are applied at the places indicated in the drawing. A positive potential is applied to the conductor 1 which is connected to switch contacts 2 and 3 of relay C. At the start switch lever $d$ is engaged with contact 3 and current is conveyed through conductor 4 to condensers 5 and 6 and the adjustable resistance 7 through the relay B to the negative side of the power supply thereby charging the condensers 5 and 6 assuming that switch 14 is closed.

Condensers 5 and 6, the variable resistance 7 and relay B comprise a timing circuit. Switch 14 which connects and disconnects condenser 6 gives a second range of timing. A dial on the variable resistance 7 may be calibrated with two ranges of miles per hour. Relay B is operated and the lever $m$ moves to the contact 8 completing a partial circuit up to the relay C which is connected by conductor 9, to the contact 10 of relay A. Now when a vehicle begins to pass microphone No. 1 the noise of the vehicle is converted by the microphone into a series of electrical impulses which are fed into the audio amplifier through the switch $j$ of relay D and conductor 11. The audio amplifier energizes relay A and moves the lever $a$ onto contact 12 and lever $b$ onto contact 10 thereby completing a circuit through the relay C via $b$–10, conductor 9 and switch $m$–8 locking the relay C in operative position while lever $d$ moves to contact 13 which has no connection. Condensers 5 and 6, if switch 14 is closed, start discharging through the varaible resistanace 7 and relay B. Relay B stays closed for a period of time determined by the setting of the varaible resistance 7. Lever $f$ of relay C will be in contact with the contact 15 and conductor 18 that goes to relay A. Also the lever $h$ of relay D is connected to lever $f$ which is connected through the contact 16 to conductor 17 to relay A. This will short out relay A which will allow the levers $a$ and $b$ to move back to the position shown. Lever $b$ of relay A applies a positive potential by conductor 23 to contact 19 and lever $e$ of relay C, conductor 20 to relay D, conductor 24 through the switch $m$ to the negative side of the line. Relay D is thus operated and lever $g$ will engage contact 21 which is connected to the positive side of the line so that relay D stays energized. The short is removed from relay A by lever $h$ of relay D moving from contact 16 to an open contact. Lever $j$ of relay D engages contact 22 cutting off microphone No. 1 and connecting microphone No. 2 to the input of the audio amplifier. If the vehicle begins to pass microphone No. 2 before the condenser 5, or 5 and 6 have discharged to the point of opening relay B, showing that the vehicle was travelling at a speed faster than that corresponding to the setting of the adjustable resistance 7, then the electrical impulse from microphone No. 2 are amplified and again operate relay A so that a positive potential is applied to relay E via $a$–12, conductor 24, switch $l$–25 of relay D. Relay E locks in by means of contact 26 and lever $k$. The pilot light across relay E indicates that the speed set on the dial of the adjustable resistance has been exceeded. Additional contacts on relay E such as $l$ and 27 can be used to control any external circuit 28, 29, such as traffic lights. Relay E is unlocked by pressing the push button.

If the vehicle travels from microphone No. 1 to microphone No. 2 at a speed slower than that corresponding to the setting of the variable resistance 7, the condenser 5 or 5 and 6 will discharge to the point of opening relay B before E has operated. The electrical circuits to relays C and D will be opened, microphone No. 1 again connected to the audio amplifier and the equipment is ready to start a new cycle of opeartion.

A counter operated by relay C would count the number of vehicles passing and a counter operated by relay E would record the number of vehicles exceeding the speed set by the adjustable resistance 7.

It will be immediately apparent to anyone versed in the art that the two microphones could be connected to separate audio amplifiers without altering the method of speed determination disclosed in this invention.

Having thus described my invention, what I claim is:

1. Electrical means for determining the speed at which an object, such as an automotive vehicle moves, by picking up an audible sound made by said vehicle said means including a D. C. source of power, a main pilot light to show that said power is available and ready for use, a series of relays adapted to be connected to said source, a pair of microphones for receiving sounds in sequence and controlled by one of said relays, an audio-amplifier connected between one of said relays and the microphone that receives the first signal or sound from an approaching vehicle, one of said relays acting as a timer and being connected through an inductance to a capacitance and normally connected across said source of power, when the same is initially applied, another relay operated by the relay under control of the amplifier, a further relay operated by the last mentioned relay and locking means for the relay which switches in the second microphone and connects this to the said amplifier which electrifies the second mentioned relay that then brings in the last relay of the series and this transmits the timing, set up by the microphones, to suitable recording and indicating instruments.

2. Electrical means for determining the speed at which an object, such as an automotive vehicle moves, as set forth in claim 1 further defined in that the capacitance and inductance associated with the timer relay may be adjusted to insure the proper operation of the timer relay, whereby the sounds made by the passing vehicle will be utilized through the amplifier and interconnected relays to transmit the timing to said recording and indicating instruments.

3. Electrical means for determining the speed at which an object, such as an automotive vehicle moves, as set forth in claim 1 further defined in that the timer relay and its cooperative elements as defined herein will control the operation of the other interconnected relays, so that a vehicle going past the microphones will have its time of movement indicated or recorded on suitable instruments.

4. Electrical means for determining the speed at which an object, such as an automotive vehicle moves, by picking up an audible sound made by said vehicle said means including a D. C. source of power, a main pilot light to show that said power is available and ready for use, a timing relay B operated immediately the power is applied to the circuit and having means associated therewith for determining the time it will be deenergized after power is removed, a series of four other relays identified as A, C, D and E, a pair of microphones connected to switch contacts on relay D, an amplifier connected to a switch lever associated with said contacts, a relay A connected to the amplifier which operates relay A when a sound is transmitted by the microphone first connected to the amplifier, said relay A when actuated passes current through relay C and the closed contact of relay B at the same time relay C is locked in operated position, cutting off current going to relay B but this relay is not deenergized due to the said determining means, relay C aided by a switch contact on relay D shorts out relay A which is de-energized and a swtich thereon then passes current through a closed contact on relay C to relay D via the closed contact on relay B which is still held in operative position by said associated means, relay D is then operated and locked in operated position and moves a lever from microphone 1 to microphone 2 from which energy is passed to the amplifier that immediately operates relay A and puts current back through relay B before said means lets it down, energy is now applied to relay E and the time of these sounds from the microphone will be passed by relay E to indicating or recording instruments.

5. Electrical means for determining the speed at which an object, such as an automotive vehicle moves, as set forth in claim 4 further defined in that said means, associated with relay B to prevent its immediate de-energization, comprises a capacitance and inductance both of which are preferably adjustable.

6. An electrical circuit for determining the speed of travel of automotive vehicles, said circuit including a sequence of relays, one of which controls the timing parts of said circuit and energized when operating power is applied to the circuit, a pair of microphones and an audio-amplifier, one of said microphones being initially connected by one of said relays to the amplifier for transmitting thereto sounds picked up at the front end of a passing vehicle, a relay operated by the amplifier, said relay in turn actuating another relay that is automatically locked in position by way of a closed contact on the timer relay, a further relay for de-energizing said amplifier relay at the same time switching the timing part of the circuit onto the second microphone as the rear end of the vehicle passes the microphone, said amplifier relay being re-energized by the last mentioned microphone for the purpose described, and a further relay actuated by said amplifier relay on its re-energization to transmit, the time taken by the vehicle to pass the two microphones, to suitable indicating or recording instruments.

7. An electrical circuit as set forth in claim 6 further defined in that said timer relay is held in operative position when its first energizing circuit is opened by one of the relays, said holding being the conjoint action of capacitance and inductance as described.

8. An electrical circuit as set forth in claim 6 further defined in that said timer relay is held in operative position when its first energizing circuit is opened by one of the relays, said holding being the conjoint action of capacitance and inductance both of which are preferably adjustable whereby the timer relay action may be controlled to suit the time between the actions of the two microphones on the amplifier relay.

9. Means for determining whether objects travel at a speed slower or faster than a pre-set speed by picking up the audible noise of the moving objects with two microphones a set distance apart, said means including switching first one and then the other of said microphones to the input of an audio amplifier, and further switching means operated by the output of the amplifier for the purpose described, an adjustable time delay means including a calibrated dial, and a visual and/or audible alarm to indicate the set speed has been exceeded.

10. Means for determining whether objects travel at a speed faster than a pre-set speed by picking up the audible noise of the moving objects with two microphones a set distance apart, said means including switching first one and then the other of said microphones to the input of an audio amplifier, and further switching means operated by the output of the amplifier for the purpose described, and adjustable time delay means including a calibrated dial, and a switching means to operate remote traffic lights if the speed set on the adjustable timer is exceeded.

11. A termination means as set forth in claim 9 further defined in that counters are used to record the number of objects which pass and to record the number which exceed the speed set on the adjustable timer.

12. A termination means as set forth in claim 10 further defined in that counters are used to record the number of objects which pass and to record the number which exceed the speed set on the adjustable timer.

13. Means for determining the speed of objects by picking up the audible noise of the moving objects with two microphones a set distance apart, said means including switching first one and then the other of said microphones to the input of an audio amplifier, and further switching means operated by the output of the amplifier for the purpose described, and a timing device reading the speed of the objects directly on a calibrated dial or recording device.

References Cited in the file of this patent

UNITED STATES PATENTS

| | | |
|---|---|---|
| 1,946,290 | Lord | Feb. 6, 1934 |
| 1,958,631 | Login, Jr. | May 15, 1934 |
| 2,284,850 | Smith | June 2, 1942 |